United States Patent [19]

Steinberg

[11] Patent Number: 4,466,492

[45] Date of Patent: Aug. 21, 1984

[54] EARTHWORKING IMPLEMENT HAVING SPRING BIASED ARMS

[75] Inventor: Richard W. Steinberg, North Mankato, Minn.

[73] Assignee: Hiniker Company, Mankato, Minn.

[21] Appl. No.: 319,185

[22] Filed: Nov. 9, 1981

[51] Int. Cl.³ ............................................. A01B 39/08
[52] U.S. Cl. .................................... 172/551; 172/573; 172/711
[58] Field of Search ............... 172/705, 711, 572, 573, 172/462, 500, 497, 551

[56] References Cited

U.S. PATENT DOCUMENTS

| | | | |
|---|---|---|---|
| 22,915 | 2/1829 | Boyer ................................ | 172/711 X |
| 284,278 | 9/1883 | Cobb . | |
| 301,163 | 7/1884 | Rix . | |
| 692,939 | 2/1902 | Stanton . | |
| 1,091,831 | 3/1914 | Gibbons ............................ | 172/711 |
| 1,228,695 | 6/1917 | Ogle . | |
| 1,249,008 | 12/1917 | Bonds, Jr. . | |
| 1,388,498 | 8/1921 | Welke ............................... | 172/462 X |
| 1,528,181 | 3/1925 | Bellinghausen ................... | 172/573 |
| 2,252,593 | 8/1941 | Bruene ............................... | 97/55 |
| 2,493,811 | 1/1950 | Graham ............................. | 97/184 |
| 2,627,798 | 2/1953 | Graham ............................. | 97/184 |
| 2,701,512 | 2/1955 | Haynes ............................... | 97/216 |
| 2,712,780 | 7/1955 | Graham ............................. | 97/47.84 |
| 2,756,662 | 7/1966 | Christensen ...................... | 97/245 |
| 3,227,226 | 1/1966 | Bayne ................................ | 172/705 |
| 3,439,749 | 4/1969 | Olsson .............................. | 172/572 |
| 3,461,973 | 8/1969 | Geurts ............................... | 172/705 X |
| 3,608,646 | 9/1971 | Ryan .................................. | 172/500 |
| 3,627,063 | 12/1971 | Ryan .................................. | 172/627 |
| 3,706,345 | 12/1972 | Patterson .......................... | 172/572 |
| 3,734,201 | 5/1973 | Zaun .................................. | 172/573 |
| 3,815,685 | 6/1974 | Seifert ............................... | 172/705 |
| 3,923,103 | 12/1975 | Davis et al. ...................... | 172/201 |
| 3,967,685 | 7/1976 | Siekmeier ......................... | 172/573 |
| 4,005,757 | 2/1977 | Hess .................................. | 172/710 |
| 4,011,916 | 3/1977 | Neal et al. ......................... | 172/710 |
| 4,102,406 | 7/1978 | Orthman ........................... | 172/551 |
| 4,194,575 | 3/1980 | Whalen ............................. | 172/573 |
| 4,312,409 | 1/1982 | Mills ................................. | 172/572 |

FOREIGN PATENT DOCUMENTS

| | | | |
|---|---|---|---|
| 28081 | 7/1930 | Australia .......................... | 172/572 |
| 918689 | 12/1963 | France . | |
| 930985 | 7/1964 | France . | |
| 55677 | 11/1943 | Netherlands ..................... | 172/711 |

OTHER PUBLICATIONS

*Hiniker Rotary Hoe* Brochure.

Primary Examiner—Richard J. Johnson
Attorney, Agent, or Firm—Burd, Bartz & Gutenkauf

[57] ABSTRACT

A rotary hoe has a tool bar mounted on a tractor and a plurality of individually pivoted arms carrying hoe wheels. Springs bias the arms in a downward direction to force the hoe wheels into the soil. A rotatable torsion tube supports the springs. An adjustable lock apparatus secured to the torsion tube is used to rotate the tube to adjust the biasing force of the springs.

31 Claims, 19 Drawing Figures

EARTHWORKING IMPLEMENT HAVING SPRING BIASED ARMS

BACKGROUND OF INVENTION

The invention relates to an earthworking implement used with a draft vehicle for working the soil behind the vehicle. More particularly, the invention is a tractor pulled rotary hoe having individually biased hoe wheels for working the soil.

Rotary hoes mounted on the hitch structures of relatively large agricultural tractors work soil behind and laterally of the tractors. Under the same soil conditions, as hard or packed soil, the top layer of soil is not readily worked by the conventional rotary hoes. The soil that is not compacted or hard can be overworked with the conventional rotary hoes. This results in some types of soils being underworked and other soils being overworked.

Zaun in U.S. Pat. No. 3,734,201 discloses a rotary hoe having a tool bar mounted on the three-point hitch of a tractor. Biased arms attached to rotary hoe wheels bias the wheels into the ground. The biasing force on the wheels is substantially the same over the length of the tool bar and is limited to the weight of the tool bar.

Whalen in U.S. Pat. No. 4,194,575 discloses a rotary hoe that is substantially the same as the Zaun rotary hoe. Coil springs associated with each pivoted arm of the hoe function to bias a rotary hoe wheel into the soil. The biasing forces on the rotary hoe wheels along the length of the tool bar are substantially the same and are limited to the weight of the tool bar. The biasing force on each wheel can be varied between 19 to 23 pounds by raising or lowering the tool bar of the rotary hoe.

Earthworking implements have been used with draft vehicles for working the soil behind the drive wheels of the vehicle. These implements have frame structures adapted to be releasably mounted on the hitch of the vehicle. The frame structures are shaped to permit the connection of a tongue of a second implement to the conventional draw bar. Lundin in U.S. Pat. No. 4,195,696 discloses an earthworking implement for working the soil compacted by the heavy wheels of a tractor. The frame of the implement is raised and lowered to change the working depth of the earthworking spring tools.

SUMMARY OF INVENTION

The invention is related to an earthworking implement, such as a rotary hoe, equipped with individual spring biased earthworking tools. Adjustable means are provided for varying the biasing force on the earthworking tools allowing selected sections of the earthworking tools to be biased with greater force in the earthworking position than other sections of tools. The selectively biased earthworking tools are associated with means to adjust the biasing force on the tools to accommodate different types of soil conditions which can range from compacted hard soil to light loose sandy soil.

The implement has a tool bar adapted to be mounted on a three-point hitch of a tractor. A first support extended along the length of the tool bar is mounted on the tool bar with spaced blocks. A plurality of arms are pivotally mounted on the first support for movement about a generally horizontal axis. A earthworking tool, as a rotary hoe wheel, mounted on the lower end of each arm, functions to work the soil on movement of the implement relative to the ground. A pair of rotary hoe wheels can be mounted on each arm.

A second support extended generally parallel to the first support is mounted on the blocks. Biasing means mounted on the second support function to bias each of the arms in a downward direction to force the tool into the soil. In one form of the invention, the biasing means is a coil spring having a first end non-rotatably associated with the second support and a second end extended as a spring arm. The outer end of the spring arm is connected to an arm that carries an earthworking tool whereby the coil spring biases the tool downwardly toward the soil. The biasing force of the coil spring is adjustable so that sections of the earthworking tools can be adjusted to have different earthworking forces. An adjustable locking means is used to hold the second support in a selected adjusted position thereby maintaining the biasing force of the coil spring at a desired level. In one form, the adjustable locking means is a ratchet wheel mounted on the second support. A pivoted locking pawl cooperates with the ratchet wheel to hold the wheel in a fixed position thereby locking the second support. In another form, the adjustable locking means is an arm non-rotatably connected to the second support. An adjustable means, as a threaded rod and nut, is used to move the arm and hold the arm in an adjusted position. The adjustable means is operable to either increase or decrease the biasing force of the coil spring on the earthworking tools.

The biasing means for the arms, in another form, comprises a spring assembly having a pair of coil springs joined together with a neck. The outer ends of the coil springs have elongated arms that are connected to separate arms carrying earthworking tools. The coil springs surround the second support. A member non-rotatably mounted on the second support is coupled to the neck so that rotation of the second support by the adjustable locking means changes the biasing forces of the coil springs. This changes the biasing forces exerted on the arms and earthworking tools mounted on the arms. The adjustable locking means is used to adjust the biasing forces of selected sections or groups of arms carrying earthworking tools. The biasing force on some of the arms of the tractor is increased as compared to other arms so that the earthworking tools effectively work the soil behind the tractor.

DESCRIPTION OF A PREFERRED EMBODIMENT

Figure 1:
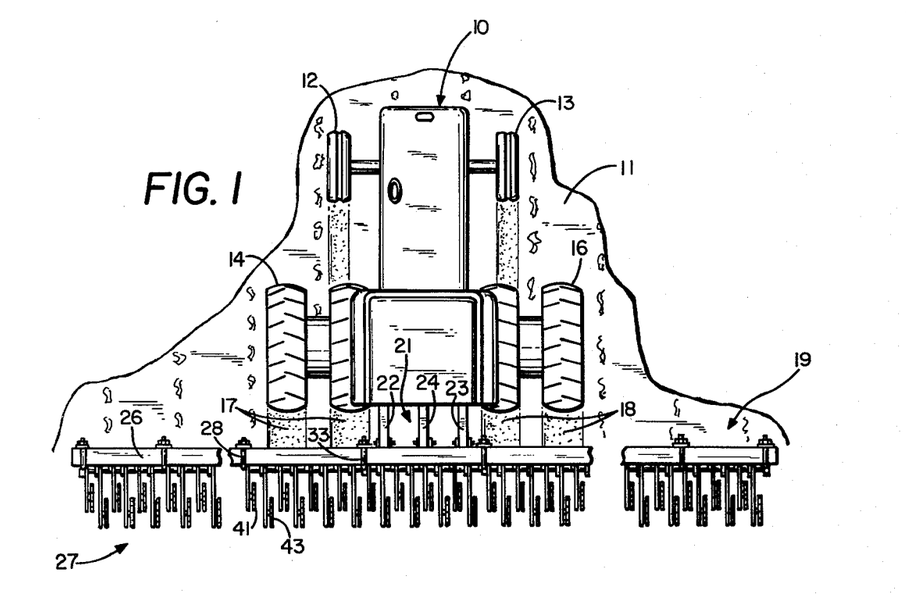
FIG. 1 is a diagrammatic plan view of a rotary hoe of the invention mounted on the three-point hitch of a tractor.

Referring to the drawings, there is shown in FIG. 1 an agricultural tractor indicated generally at 10 located in a field 11 having a row crop, such as corn, soybeans, sunflowers and the like. Tractor 10 has a pair of steerable front wheels 12 and 13 and dual rear drive wheels 14 and 16. Tractor 10, a conventional power vehicle used to operate and pull conventional agricultural implements and machines, is a relatively heavy machine. When tractor 10 is driven in field 11, wheels 12, 14 and 13, 16 compact the soil in longitudinal tracks 17 and 18. The compactness or density of the soil in tracks 17 and 18 is greater than soil adjacent the tracks. The degree of compaction of soil varies with the type of soil and moisture conditions of the soil.

An earthworking implement, known as a rotary hoe, indicated generally at 19, is mounted on the three-point hitch 21 on the rear of tractor 10. The three-point hitch 21 has conventional draft links 22 and 23 and a central control link 24 connected to a transverse tool bar or rigid box beam 26 of implement 19. The tool bar 26 can be hinged together allowing the outer end sections thereof to fold upwardly to transport positions.

Earthworking tool or hoe assemblies indicated generally at 27 are mounted along the length of tool bar 26. The earthworking tool assemblies 27 function to work the soil and break up compacted soil to provide generally uniform tillage of the soil.

Figure 2:
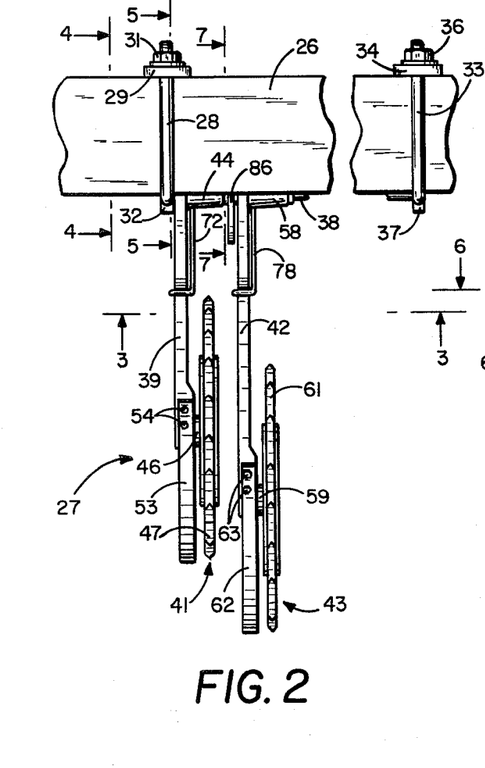
FIG. 2 is a fragmentary plan view of a section of the rotary hoe.
Figure 3:
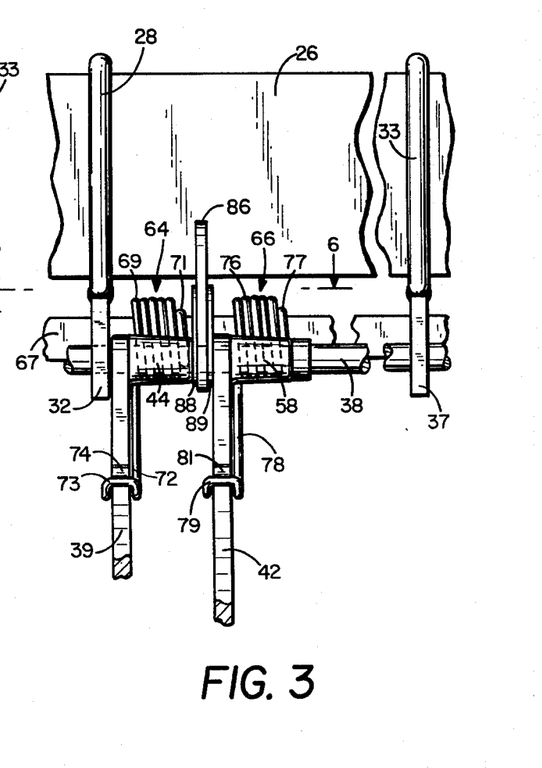
FIG. 3 is an enlarged sectional view taken along line 3—3 of FIG. 2.

Referring to FIGS. 2 and 3, an earthworking tool assembly 27 is mounted on tool bar 26 with a plurality of U-bolts 28 and 33 located along the length of tool bar 26. U-bolt 28 extends through a plate 29 clamped against the front side of tool bar 26 with a pair of nuts 31. A block 32 is welded to the bottom leg of U-bolt 28. A plate 34 accommodates the ends of U-bolt 33. Nuts 36 on U-bolt 38 clamp plate 34 to the front side of tool bar 26. A block 37 is secured by a weld to the lower leg of U-bolt 33. Blocks 32 and 37 have aligned holes for accommodating a transverse rod or cylindrical bar 38.

Rod 38 provides a transverse support for independently movable arms 39 and 42 and the remaining arms of tool assembly 27. Alternate arms 39 and 42 have different lengths, with the arm 42 being the longer arm. Rotary hoe wheels indicated generally at 41 and 43 are rotatably mounted on the lower ends of arms 39 and 42, respectively. A pair of rotary hoe wheels can be mounted on the lower ends of each arms. An example of a pair of rotary hoe wheels on an arm is disclosed in U.S. Pat. No. 3,734,201.

Figure 4:
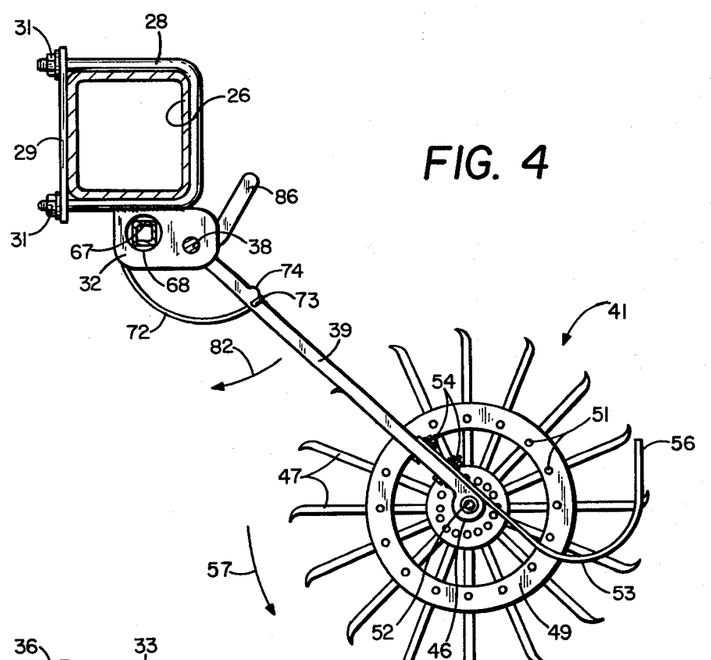
FIG. 4 is an enlarged sectional view taken along line 4—4 of FIG. 2.
Figure 5:
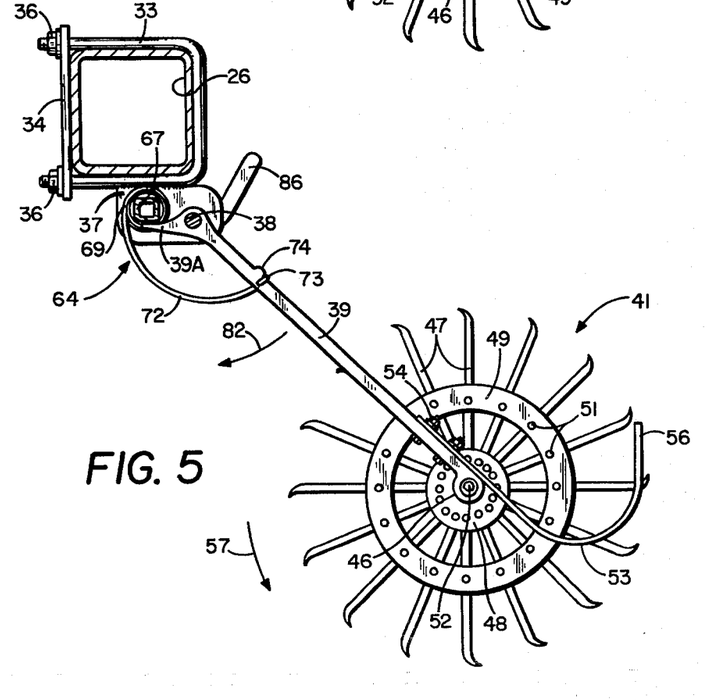
FIG. 5 is an enlarged sectional view taken along line 5—5 of FIG. 2.

Arm 39 is integral with a transverse head or boss 44 having a cylindrical bore accommodating rod 38 to allow the arm 39 to pivot or move up and down with respect to the axis of rod 38. As shown in FIGS. 2, 4, and 5, a sleeve 46 is integral with the lower end of arm 39. Sleeve 46 is located adjacent hub 48 of hoe wheel 41. A plurality of radially outwardly directed fingers 47 are secured to hub 48 and a pair of annular rings 49. Fasteners 51, as nut and bolt assemblies, attach rings 49 to opposite sides of fingers 47. A bolt 52 extended through sleeve 46 mounts hub 48 adjacent the inner end of sleeve 46. The outer end of sleeve 46 has a recess to accommodate a nut threaded onto bolt 52.

A trash stripping bar 53 is mounted on the lower end of arm 39 with a pair of nut and bolt assemblies 54. The stripping bar 53 extends downwardly and curves upwardly terminating in an end 56 located adjacent the outer ends of fingers 47. When implement 19 is moved in a forward direction, hoe wheel 41 rotates in a counterclockwise direction, as indicated by the arrow 57. The trash that accumulates on the fingers 47 engages the lower end of trash stripper bar 53 and moves outwardly as it rides toward and off end 56 of stripper bar 53.

Long arm 42 has a transverse upper head or boss 58 having a bore accommodating rod 38. Arm 42 and sleeve 58 rotate about the axis of rod 38 independent of the remaining arms of tool assembly 27. As shown in FIG. 2, the lower end of arm 42 has a sleeve 59 located adjacent hoe wheel 43. Hoe wheel 43 has a plurality of radially outwardly directed fingers 61 joined to a hub (not shown). A bolt mounts the hub on sleeve 59. A downwardly directed upwardly curved trash stripping bar 62 is attached with nut and bolt assemblies 63 to the lower end of arm 42. The stripping bar 62 located adjacent one side of wheel 43 functions to remove or strip trash from fingers 61 on rotation of hoe wheel 43.

Figures 6, 8, 9:
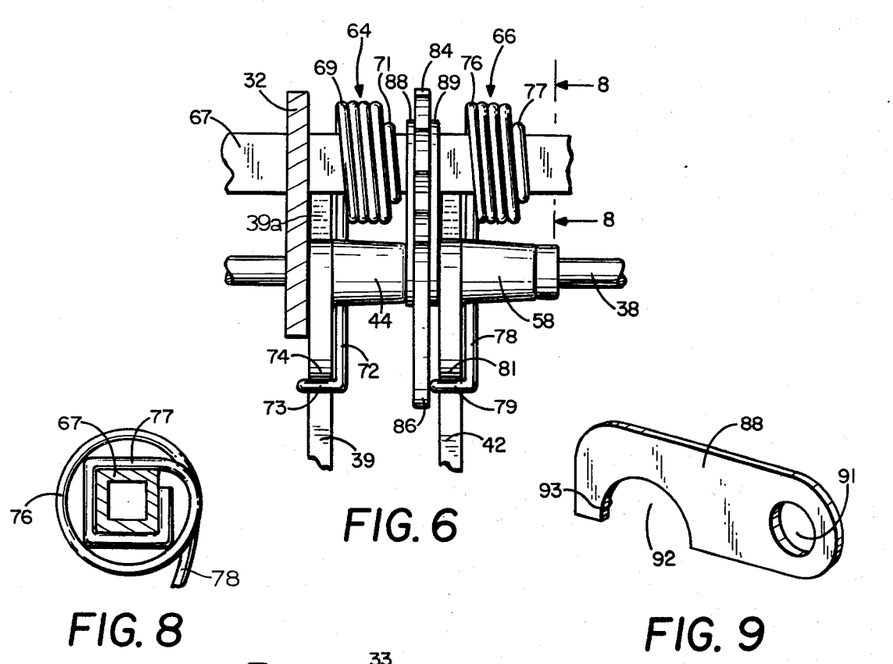
FIG. 6 is an enlarged sectional view taken along line 6—6 of FIG. 3.
FIG. 8 is a sectional view taken along line 8—8 of FIG. 6.
FIG. 9 is a perspective view of a guide plate.

As shown in FIGS. 3 and 6, a first biasing member indicated generally at 64 independently biases arm 39 in a downward direction forcing hoe wheel 41 downwardly into the ground. A second biasing member 66 cooperates with arm 42 to bias hoe wheel 43 downwardly into the ground. Biasing members 64 and 66 are mounted on a transverse control shaft, torsion tube or member 67 located below tool bar 26. Tube 67 is a rectangular tubular member having ends extended through circular holes 68 in the blocks 32 and 37.

First biasing member 64 has a coil spring body 69 located about shaft 67. Body 69 has an end 71 that has a general rectangular shape that closely fits around square tube 67 in non-rotating relationship thereto. The opposite end of body 69 is joined to a downwardly and rearwardly curved arm 72. Arm 72 terminates in a lateral hook 73 located over arm 39. The hook 73 is in back of a short boss or projection 74 on top of arm 72.

Second biasing member 66 has a coil spring body 76 located about tube 67. As shown in FIG. 8, body 76 has a generally square end 77 located in non-rotating relationship about tube 67. The opposite end of body 76 is joined to a downwardly and forwardly curved arm 78. The free or outer end of arm 78 has a lateral hook 79 extended over arm 42 adjacent a projection 81 on the top of arm 42. Projection 81 prevents hook 79 from riding up on arm 42.

As shown in FIG. 5, biasing member 64 functions to bias arm 39 in a downward direction, as indicated by arrow 82, about the axis of support rod 38. The upper end of arm 39 has a forwardly directed ear or stop member 39A that engages the bottom of tube 67 to limit the downward movement of arm 39. Arm 39 can move upwardly against biasing force of the biasing member 64 when hoe wheel 41 engages an obstruction, such as a rock or hard soil. Arm 42 has a similar forwardly directed ear or stop member that engages tube 67 to limit the downward movement of arm 42.

Figures 7, 7A:
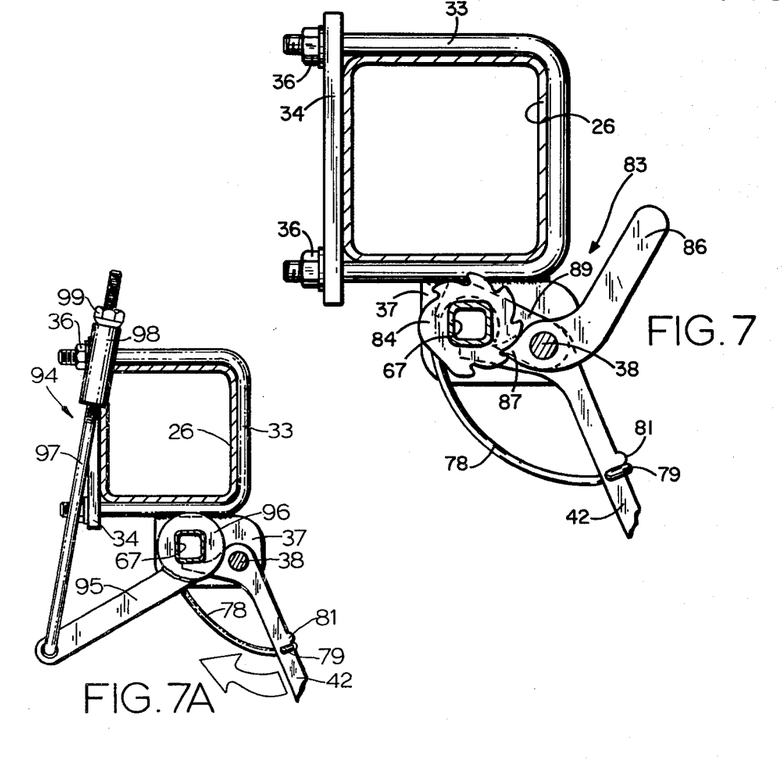
FIG. 7 is a sectional view taken along line 7—7 of FIG. 2.
FIG. 7A is a sectional view similar to FIG. 7 showing a modification of the locking apparatus used to hold and adjust the torsion tube.

A lock apparatus indicated generally at 83 in FIG. 7 operates to hold torsion tube 67 in a fixed rotational position. Lock apparatus 83 comprises a ratchet wheel 84 having a central square hole accommodating square tube 67 and outwardly directed curved teeth. The teeth engage a pawl or lever 86 rotatably mounted on support rod 38. Pawl 86 has a forwardly directed finger 87 cooperating with a tooth of ratchet wheel 84 to hold ratchet wheel 84 and tube 67 in a selected position. A pair of guide plates 88 and 89 are located on opposite sides of ratchet wheel 84 and pawl 86 to hold the ratchet wheel 84 in operative alignment with lever 86. Plates 88 and 89 also space sleeve 44 from arm 42. As shown in FIG. 9, guide plate 88 has a hole 91 for accommodating support rod 38 and a downwardly open notch 92 for accommodating the upper portion of torsion tube 67. Notch 92 has a curved surface allowing the torsion tube 67 to be rotated. The tension on the biasing springs 69 and 76 is adjusted by rotating torsion tube 67. This is done with a large wrench, such as a pipe wrench, placed over square tube 67. The tube 67, as seen in FIG. 7, can be rotated in clockwise direction thereby increasing the tension of the coil spring bodies 69 and 76 and biasing forces on arms 72 and 78 respectively. This increase in the biasing forces on arms 39 and 42 increases the penetrating forces of hoe wheels 41 and 43. The biasing forces on the rotary hoe assemblies can be adjusted to establish a biasing force on the hoe wheels between 15 to 50 pounds. In conventional tool bar rotary hoes, the weight of the tool bar provides a force on the hoe wheels of between 19 to 23 pounds.

Referring to FIG. 7A, there is shown an adjustable lock apparatus indicated generally at 94 that is used to adjust and hold torsion tube 67 and thereby adjust the torsion force of the coil springs 64 and 66 on rotary hoe arms 39 and 42. The apparatus 94 is used in lieu of lock apparatus 83. Apparatus 94 is a holding and adjusting assembly comprising an arm 95 secured to a pair of discs 96 having central square holes accommodating torsion tube 67 so that when arm 95 is angularly moved the torsion tube 67 is rotated. The forward end of arm 95 is pivotally connected to an upright rod 97. The upper end of rod 97 extends through a cylindrical sleeve 98 secured by welds or the like to the side of plate 34. A nut 99 threaded onto the upper end of rod 97 engages the top of sleeve 98. Adjustment of nut 99 causes rod 97 to angularly move arm 95, as indicated by the arrow, and vary the torsion force of the springs 64 and 66 mounted on the torsion tube 67 and thereby vary the biasing force exerted on the rotary hoe arms 39 and 42. In other words, adjustment of nut 99 will vary the biasing force of springs 64 and 66 on arms 39 and 42, as well as the remaining arms that are coupled with springs to the torsion tube 67. The threaded rod 97 and nut 99 replaces the hand tool used to rotate torsion tube 67 to vary the biasing force of springs 64 and 66. The biasing force of springs 64 and 66 can be adjusted to provide each hoe wheel 41 and 43 with 15 to 50 pounds downward biasing force to compensate for different soil conditions. This biasing force is increased where the soil is hard or compacted and reduced when the rotary hoe is used in soft light soil, as sandy and peat soil.

Figure 10:
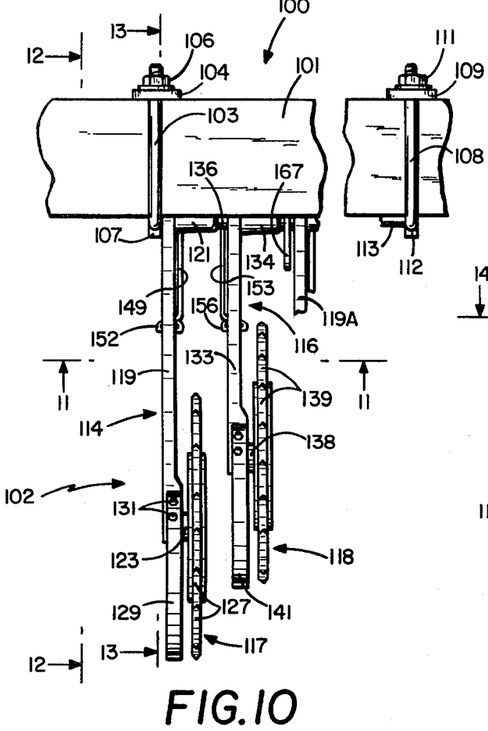
FIG. 10 is a fragmentary plan view of a modification of the rotary hoe of the invention.
Figure 11:
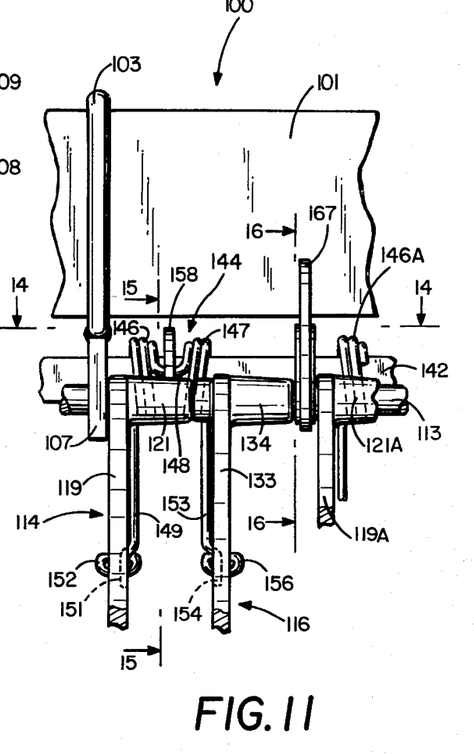
FIG. 11 is an enlarged view taken along line 11—11 of FIG. 10.

Referring to FIGS. 10 and 11, there is shown a portion of a rotary hoe indicated generally at 100. The rotary hoe 100 has a transverse tool bar 101 adapted to be mounted on a tractor with a conventional three-point hitch. The mount of tool bar 101 on the tractor is the same as the three-point hitch 21, shown on tractor 10 in FIG. 1. Other types of mounting and support structures for the tool bar can be used. A plurality of earthworking tool assemblies indicated generally at 102 are mounted on tool bar 101 to work the soil. Earthworking tool assemblies are rotary hoe assemblies having a plurality of independently biased rotary hoe wheels. Other types of earthworking tools, such as spring teeth and shovels, can be used to work the soil.

A mount structure comprising a first U-bolt 103 and a second U-bolt 108 is used to attach the earthworking tool assemblies to tool bar 101. A plate 104 is positioned on the ends of U-bolt 103 and is retained in clamping engagement with tool bar 101 with nuts 106. A block 107 is secured by welds or the like to the lower leg of U-bolt 103 below tool bar 101. A plate 109 located on the ends of U-bolt 108 is clamped into engagement with tool bar 101 with a pair of nuts 111. A block 112 is secured by welds to the lower leg of U-bolt 108 in lateral alignment with the block 107. Blocks 107 and 112 are generally rectangular plate members located in generally vertical planes.

A transverse bar 113, shown as an elongated cylindrical rod, extends between and is mounted on blocks 107 and 112. Bar 113 projects through holes in blocks 107 and 112 and can extend to additional blocks mounted with U-bolts on tool bar 101. A pair of arms indicated generally at 114 and 116 are independently pivotally mounted on the bar 113. Arms 114 and 116 have different lengths, with arm 114 being the longer arm, to alternately stagger the earthworking tools shown as rotary hoe wheels 117 and 118.

Figures 12, 13:
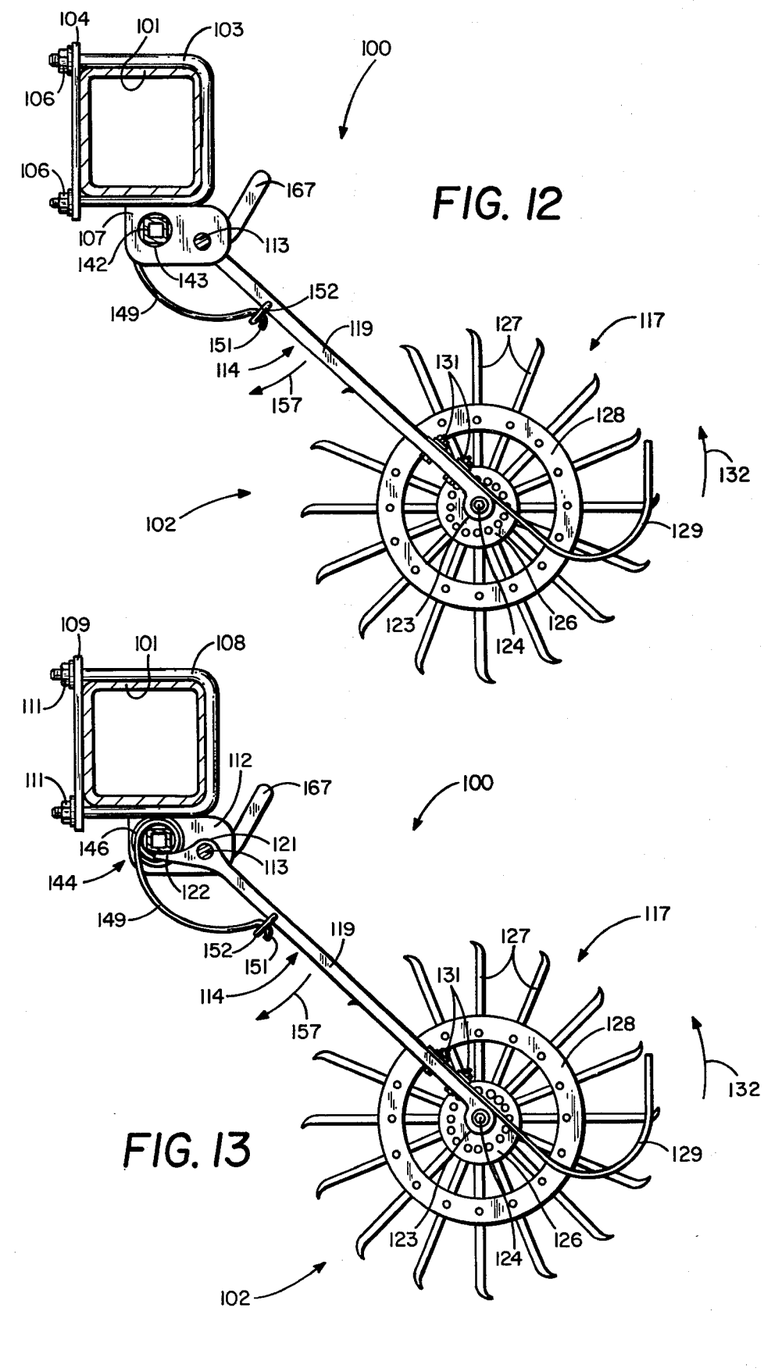
FIG. 12 is a sectional view taken along line 12—12 of FIG. 10.
FIG. 13 is a sectional view taken along line 13—13 of FIG. 10.
Figure 14:
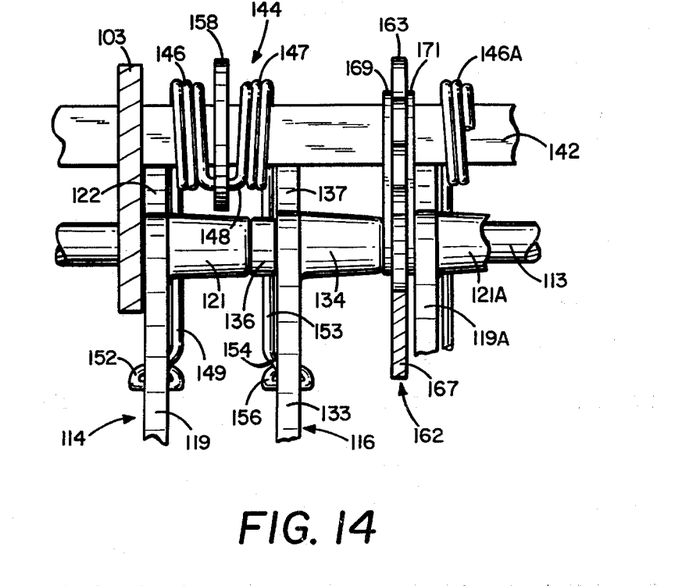
FIG. 14 is an enlarged sectional view taken along line 14—14 of FIG. 11.

Arm 114 has an elongated linear rigid body 119 secured to a head 121. Head 121 is a lateral cylindrical boss having a transverse bore accommodating bar 113. As shown in FIGS. 1 and 14, bar 113 projects through the cylindrical bore in head 121 to rotatably mount arm 114 on bar 113 for movement about a generally transverse horizontal axis. Referring to FIG. 12, a forwardly directed ear or stop projection 122 is joined to the upper end of body 119 adjacent head 121. The ear 122 engages a stop or torsion tube 142 hereinafter described to limit the downward pivotal movement of arm 114.

The lower end of body 119 has a laterally directed sleeve 123 accommodating a nut and bolt assembly 124 for rotatably supporting the hub 126 of the rotary hoe wheel 117. Rotary hoe wheel 117 has a plurality of radial and circumferentially spaced fingers or spokes 127 attached to the hub and a pair of annular rings 128. A trash stripping bar 129 having an upwardly and forwardly curved end is attached to the lower end of body 119 with a plurality of nut and bolt assemblies 131. On forward movement of the rotary hoe, the rotary hoe wheel 117 will rotate in the direction of the arrow 132. The trash collected on fingers 127 will be moved upwardly by fingers 127 into engagement with the trash stripping bar 129. Bar 129, being angularly disposed relative to fingers 127, will move the trash radially and outwardly off fingers 127 as the wheel rotates.

The second or short arm 116 has a rigid linear body 133 integral with a laterally directed head or boss 134. The head 134 has a cylindrical bore to rotatably accommodate bar 113 to thereby rotatably mount arm 116 on the bar. An annular spacer ring 136 on rod 113 spaces head 121 from the upper end of body 133. Head 134 has a forwardly directed ear 137 that engages the bottom of a control shaft, torsion tube or member 142 to limit downward movement of arm 116. The lower end of body 133 has a sleeve 138 laterally directed in the direction of head 134. A nut and bolt assembly (not shown) mounted in sleeve 138 rotatably supports rotary hoe wheel 118. Rotary hoe wheel 118 has a plurality of radially directed fingers or spokes 139. Rotary hoe wheel 118 is identical to rotary hoe wheel 117. A trash stripping bar 141 is mounted on the lower end of body 133 and functions to remove trash that may accumulate on fingers 139 during rotation of the wheel.

A transverse control shaft or torsion tube 142 is rotatably mounted on blocks 107 and 112 in front of bar 113 below tool bar 101. Blocks 107 and 112 have circular holes accommodating end portions of tube 142 to allow the tube to be rotated relative to blocks 107 and 112. As shown in FIGS. 12 to 16, control torsion tube 142 has a square cross section.

A biasing unit indicated generally at 144 is mounted on tube 142. Biasing unit 144 is a double conical coil spring assembly having a first coil torsion spring 146 and a second coil torsion spring 147. Both springs 146 and 147 surround tube 142. A short rod or V-neck 148 connects adjacent ends of springs 146 and 147. The outer end of spring 146 is joined to a first downwardly and rearwardly curved arm 149. As shown in FIGS. 11 and 12, arm 149 terminates in a downwardly turned hook 159 located in a D-ring 152. D-ring 152 has a portion extended through a hole in body 119 whereby the lower end of arm 149 is operatively connected to arm 119. Coil spring 147 has a second downwardly and rearwardly curved arm 153 terminating in a hook 154. Hook 154 engages a D-ring 156 connected to body 133 of arm 116. Coil springs 146 and 147 function to bias arms 114 and 116 in a downward direction to hold the ears 122 and 137 in engagement with the lower portion of tube 142. Springs 146 and 147 allow the arms 114 and 116 to move independently upwardly against the biasing force of the springs, thereby allowing the rotary hoe wheels 116 and 117 to independently move and roll over obstacles, such as rocks, logs, and the like, that may be in the soil and hard areas of soil.

Figure 15:
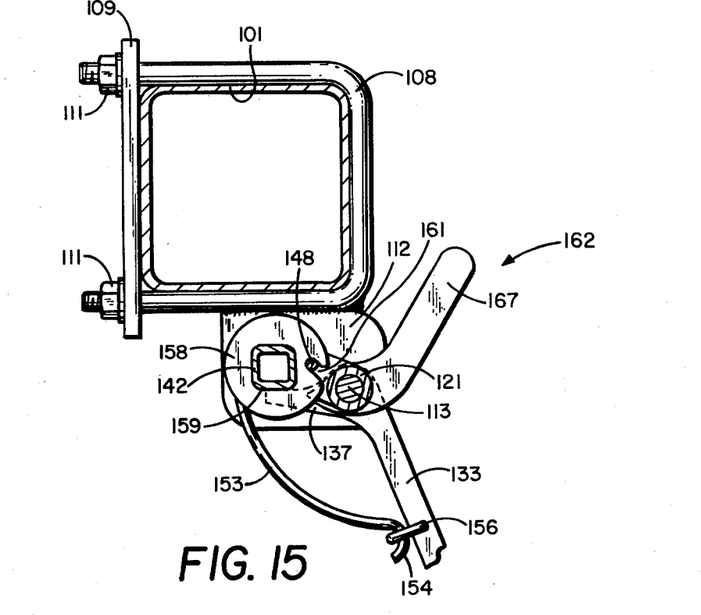
FIG. 15 is an enlarged sectional view taken along line 15—15 of FIG. 11.

A spring lock or disc 158 is mounted on tube 142 between the coil torsion springs 146 and 147. As shown in FIG. 15, spring lock 158 is a circular disc having a square central hole 159 conforming to the square shape of the outer surface of tube 142. Spring lock 158 rotates with tube 142. The rear side of spring lock 158 has a downwardly and rearwardly inclined notch or pocket 161 accommodating neck 158 of spring assembly 144. The spring lock 158, through notch 161 and spring neck 148, anchors the adjacent ends of springs 146 and 147 with respect to tube 142. Coil springs 146 and 147 located adjacent opposite sides of disc 158 in conjunction with neck 148 centers the disc 158 between springs 146 and 147. Disc 158 is self-centering as additional structures are not used to locate disc 158 on tube 142. Coil springs 146 and 147 and disc 158 are laterally movable on tube 142 to allow for lateral adjustment of arms 119 and 133. Also, spring arms 149 and 153 can be laterally moved relative to each other so that the lateral space between adjacent arms 119 and 133 can be varied.

Figure 16:
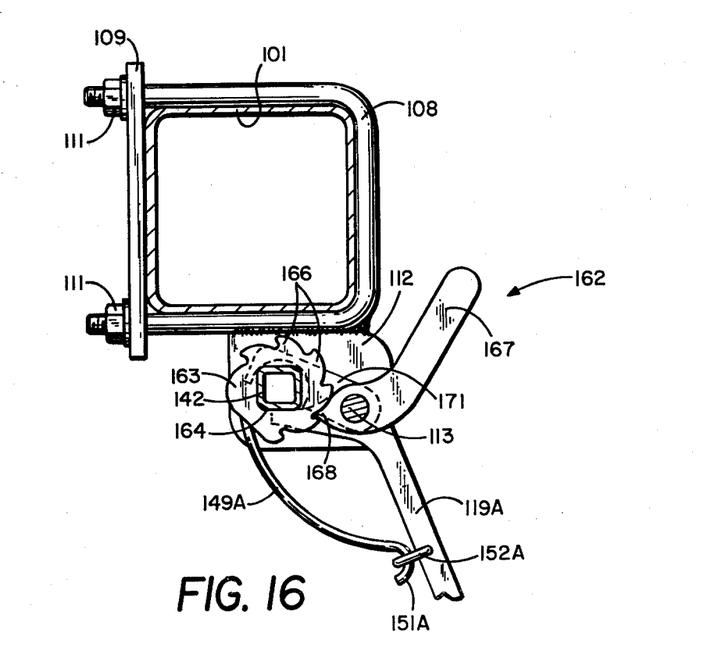
FIG. 16 is an enlarged sectional view taken along line 16—16 of FIG. 11.

Referring to FIG. 16, a lock apparatus indicated generally at 162 is operable to hold tube 142 in an adjusted circumferential position, thereby adjusting the torsion forces of coil torsion springs 146 and 147. This adjustment enables the operator to adjust the downward biasing forces of arms 114 and 116 to compensate for compact soil conditions, such as the compacted soil portions or tracks 17 and 18, caused by the tractor wheels 14 and 16 shown in FIG. 1. Lock apparatus 162 comprises a ratchet wheel 163 non-rotatably mounted on tube 162. Ratchet wheel 163 has a square central hole 164 complementary to the square cross sectional shape of tube 142 so that the ratchet wheel 163 will rotate with tube 142. The ratchet wheel 163 has a plurality of circumferentially spaced outwardly counterclockwise inclined teeth 166. A lever 167 is rotatably mounted on bar 113 in longitudinal alignment with ratchet wheel 163. Lever 167 has a forwardly directed nose 168 adapted to engage a tooth to hold the ratchet wheel in a selected circumferential position. Ratchet wheel 163 is maintained in longitudinal alignment with lever 167 with a pair of guide plates 169 and 171 located on opposite sides of the ratchet wheel 163 and lever 167. Guide plates 169 and 171 are identical to the guide plate 88 shown in FIG. 9. The guide plates 169 and 171 both have holes for accommodating bar 113 and downwardly opened generally inverted U-shaped notches for accommodating the square tube 142, thereby allowing tube 142 to be rotated with a hand tool, such as a large wrench. The biasing forces of coil springs 146 and 147 can be increased or decreased by rotating tube 142 and locking the tube in a selected rotated position with lock apparatus 162. A large wrench, such as a pipe wrench, is operatively coupled to tube 142. The wrench is used to rotate tube 142 in a clockwise direction, as viewed in FIG. 16. This increases the biasing force on arm 119A thereby increasing the soil penetrating force of the rotary hoe wheel mounted on the end of arm 119A. Spring lock 158 rotates with tube 142. The lock 158 rotates the spring neck 148 in a clockwise direction, thereby increasing the biasing forces of the coil springs 146 and 147. As shown in FIG. 16, lever 167 holds tube 142 in a selected circumferentially orientated position. Nose 168 engages a tooth 166 of wheel 163 to prevent reverse rotation of wheel 163 thereby retaining springs 146 and 147 in a selected state of tension.

The biasing forces of coil springs 146 and 147 are relaxed by releasing lever 167 from the ratchet pawl 163. This is accomplished by rotating the ratchet wheel with the use of the wrench on tube 142 in a clockwise direction so that finger 148 of lever 167 can be disengaged from the teeth 166 of the ratchet wheel. The control shaft 142 and spring lock 158 is free to rotate in a counterclockwise direction, thereby relaxing springs 146 and 147. The lever 167 is then moved downward to a lock position so that the finger 168 will engage a ratchet tooth and thereby fix the rotational position of the ratchet wheel and tube 142.

Figure 17:
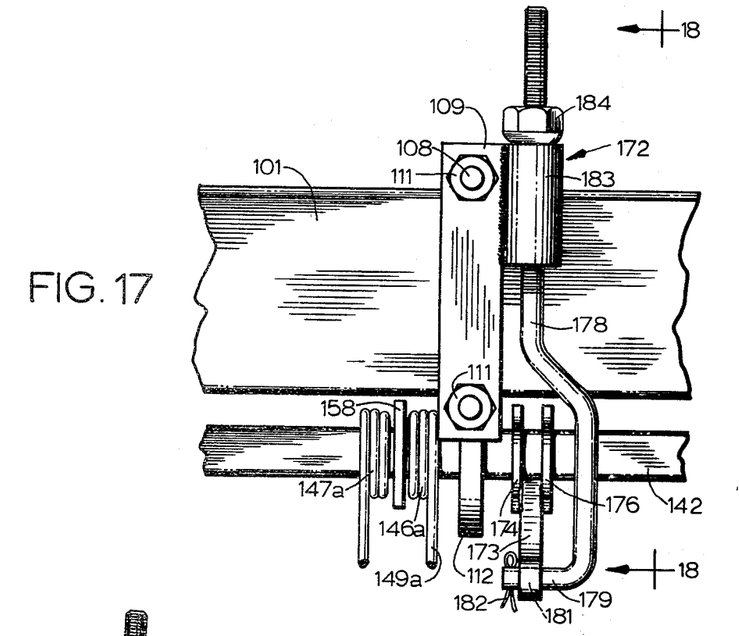
FIG. 17 is an elevational view of a modification of the spring torsion adjusting and locking apparatus.
Figure 18:
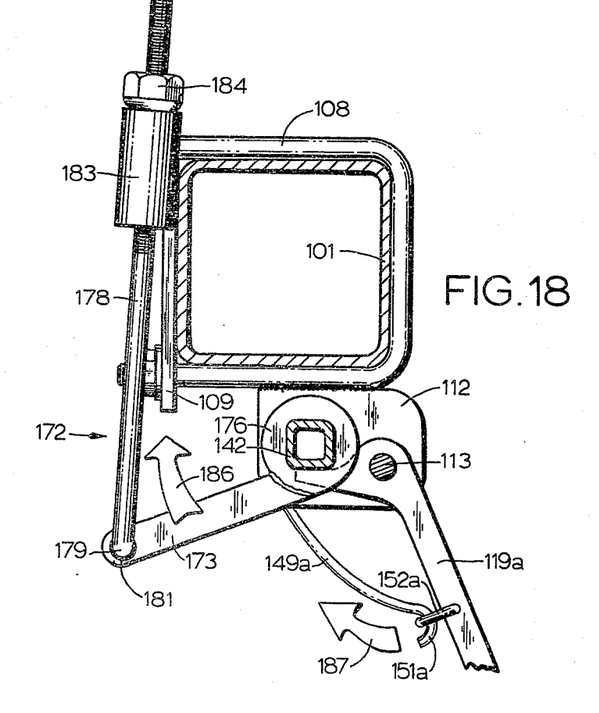
FIG. 18 is a sectional view taken along line 18—18 of FIG. 17.

Referring to FIGS. 17 and 18, there is shown a modification of the lock apparatus indicated generally at 172 for adjusting and holding the adjusted position of the torsion tube 142 and thereby varying the biasing forces of springs 146 and 147 on the rotary hoe arms 119 and 133 and hoe wheels 117 and 118 rotatably mounted thereon.

Lock apparatus 172 is an adjustable assembly having an arm 173 secured to a pair of discs 174 and 176 by welds or the like. Discs 174 and 176 each have a square hole 177 accommodating the square torsion tube 142. The outer end of arm 173 is pivotally connected to an upright rod 178. Rod 178 has a right angle end 179 that extends through a hole 181 in arm 173. A retainer, such as a cotter key 182, maintains rod end 179 in pivotal relation with arm 173. The upper end of arm 178 is threaded and extends through a sleeve 183 secured by welds or the like to the side of plate 109. Sleeve 183 has a passage substantially larger than the diameter of the rod to allow rod 178 to laterally move or swing in sleeve 183. A nut 184 threaded onto rod 178 bears against the top of sleeve 183 to hold arm 173 in a selected adjusted position. Nut 184 can be turned with a conventional wrench to change the angular position of arm 173 and thereby change the rotational position of torsion tube 142. This changes the biasing forces of springs 146A and 147A and adjusts the force of the springs on the rotary hoe arms 119 and 133. In use, the nut 184 can be turned to adjust the torsion or biasing force of the spring assembly on hoe wheels 117 and 118 from between 15 to 50 pounds. The biasing force on hoe wheels 117 and 118 is adjusted to compensate for the compaction or density of the soil to be worked with rotary hoe wheels 117 and 118.

While there has been shown and described the preferred embodiments of the implement and adjustable biasing means, it is understood that changes, alterations, and modifications can be made without departing from the invention. The invention is defined in the following claims.

The embodiments of the invention in which an exclusive property or privilege is claimed are defined as follows:

1. An earthworking implement comprising: a tool bar, means for connecting the tool bar to a tractor, first support means connected to the tool bar, said first support including a rod extended generally parallel to the tool bar, means mounting the rod on the tool bar, first and second arms pivotally mounted on the rod for independent movement in a generally upright direction, earthworking tool means mounted on each arm for working the soil; second support means connected to the tool bar, said second support means including a torsion member extended generally parallel to the rod, said means mounting the rod on the tool bar having holes accommodating the torsion member whereby the torsion member can be rotated, biasing means mounted on the torsion member, said biasing means comprising a spring assembly having a first coil body having opposite ends, a second coil body having opposite ends, a neck section connected to adjacent ends of the first and second coil bodies, a first member joined to an end opposite the adjacent end of the first coil body, said first member being connected to the first arm pivotally mounted on the rod, a second member joined to an end opposite the adjacent end of the second coil body, said second member being connected to the second arm pivotally mounted on the rod, means engageable with the neck section to non-rotatably connect the first and second coil bodies to the torsion member, and means for rotating the torsion member to adjust the biasing forces of the biasing means on the first and second arms and holding the torsion member in an adjusted position whereby the biasing forces on said first and second arms are maintained.

2. The implement of claim 1 wherein: said arms having sleeves with bores accommodating said rod to pivotally mount the arms on the rod.

3. The implement of claim 2 wherein: the means mounting the rod on the tool bar include spaced block means, and means connecting the block means to the tool bar, said block means having means accommodating the second support means to connect the second support means to the tool bar.

4. The implement of claim 3 wherein: each of said block means having a hole accommodating the torsion member whereby the torsion member can be turned to adjust the biasing forces on said first and second arms.

5. The implement of claim 4 wherein: each of said first and second arms has an ear projected from said sleeve, said ear being engageable with said torsion member to limit downward movement of said arms.

6. The implement of claim 4 wherein: the means for holding the torsion member in an adjusted position includes a ratchet wheel non-rotatably mounted on the torsion member, and releasable lock means for holding the ratchet wheel in an adjusted non-rotatable position.

7. The implement of claim 6 wherein: the releasable lock means includes a pivoted pawl having a portion thereof engageable with said ratchet wheel to hold the ratchet wheel in an adjusted non-rotatable position.

8. The implement of claim 4 wherein: the means for holding the torsion member in an adjusted position includes a holding arm non-rotatably connected to the torsion member, and means attached to the holding arm for moving the holding arm and retaining the holding arm in a selected position thereby adjusting the force of the biasing means and holding the biasing means in the adjusted selected position.

9. The implement of claim 8 wherein: the means attached to the arm includes an adjusting rod, a sleeve secured in fixed relation to the tool bar, and means cooperating with the adjusting rod and sleeve to move the adjusting rod and hold the adjusting rod in a selected position thereby adjusting the force of the biasing means and holding the biasing means in the adjusted position.

10. The implement of claim 1 wherein: the means engageable with the neck section comprises a holding member slidably mounted on the torsion member for movement along the length of the torsion member, said holding member being non-rotatably mounted on said torsion member.

11. The implement of claim 10 wherein: said holding member has a notch accommodating said neck section.

12. The implement of claim 10 wherein: the means for holding the biasing means in an adjusted position includes a holding arm non-rotatably mounted on the torsion member, and means attached to the arm for moving the arm and holding the arm in a selected position, thereby adjusting the force of the biasing means and holding the biasing means in an adjusted position.

13. An earthworking implement comprising: a tool bar, a rod spaced from and extended generally parallel to said tool bar, mount means connecting the rod to the tool bar, a plurality of first and second arms pivotally mounted on the rod, each of said arms being independently movable in upward and downward directions, earthworking tool means mounted on each arm for working soil, a torsion member extended generally parallel to the rod rotatably mounted on the mount means, biasing means for biasing the first and second arms in a downward direction to yieldably locate the earthworking tool means in soil working positions, said biasing means comprising a coiled spring assembly having a first coiled body having opposite ends, a second coiled body having opposite ends, said first and second coiled bodies being located about the torsion member, a neck section connecting adjacent ends of said first and second coiled bodies, a first member joined to an end opposite the adjacent end of the first coiled body, said first member being connected to said first arm that is connected to an earthworking tool means, and a second member joined to an end opposite the adjacent end of the second coiled body, said second member being connected to an arm that is connected to an earthworking tool means adjacent said one arm, means engageable with the neck section to non-rotatably connect the first and second coiled bodies to the torsion member and means for rotating the torsion member to adjust the biasing forces of the biasing means and holding the torsion member in an adjusted position whereby the biasing forces on said first and second arms is maintained.

14. The implement of claim 13 wherein: the means engageable with the neck section comprises a holding member slidably mounted on the torsion member for movement along the length of the torsion member, said holding member being non-rotatably mounted on said torsion member.

15. The implement of claim 14 wherein: said holding member has a notch accommodating said neck section.

16. The implement of claim 14 wherein: the means for holding the biasing means in an adjusted position includes a holding arm non-rotatably mounted on the torsion member, and means attached to the arm for moving the arm and holding the arm in a selected position, thereby adjusting the force of the biasing means and holding the biasing means in an adjusted position.

17. The implement of claim 14 wherein: each arm has an ear engageable with said torsion member to limit downward movement of said arm.

18. The implement of claim 14 wherein: the means for holding the torsion member in an adjusted position includes a holding arm non-rotatably connected to the torsion member, and means attached to the holding arm for moving the holding arm and retaining the holding arm in a selected position thereby adjusting the force of the biasing means and holding the biasing means in the adjusted selected position.

19. The implement of claim 14 wherein: the means for holding the torsion member in an adjusted position includes an adjustable lock means having a ratchet wheel non-rotatably mounted on the torsion member, and releasable means for holding the ratchet wheel in an adjusted non-rotatable position.

20. The implement of claim 19 wherein: the releasable means includes a pivoted pawl having a portion thereof engageable with said ratchet wheel to hold the ratchet wheel in an adjusted non-rotatable position.

21. The implement of claims 1 or 13 wherein: the earthworking tool means comprises a single rotary hoe wheel rotatably mounted on each arm.

22. A biasing adjusting apparatus comprising: a support, rod means located adjacent the support, mount means connecting the rod means to the support, a pair of arms pivotally mounted on the rod means for independent movement between first and second positions; a torsion member having a longitudinal axis rotatably mounted on the mount means adjacent the rod means for rotational movement about the longitudinal axis of the member, biasing means mounted on the member connected to each arm for biasing the arms toward the first position, said biasing means comprising a coiled spring assembly having first and second coil bodies located about the torsion member, a neck section connecting adjacent ends of the bodies, a first member connecting the first body to the first arm, a second member connecting the second body to the second arm whereby the coil bodies bias the arms to the first position, means engageable with the neck section to non-rotatably connect the neck section to the torsion member, means for rotating the torsion member to adjust the biasing forces of the biasing means and holding the torsion member in an adjusted position whereby the biasing force on the arms is maintained.

23. The apparatus of claim 22 wherein: said arms having sleeves rotatably mounted on the rod means.

24. The apparatus of claim 23 wherein: the mount means includes block means secured to separate portions of the rod means, said block means having holes for rotatably accommodating the member.

25. The apparatus of claim 22 wherein: the means for holding the torsion member in an adjusted position includes a holding arm non-rotatably connected to the member, and means attached to the holding arm for moving the holding arm and retaining the holding arm in a selected position thereby adjusting the force of the biasing means and holding the biasing means in the adjusted selected position.

26. The apparatus of claim 25 wherein: the means attached to the holding arm includes an adjusting rod, a fixed sleeve and means cooperating with the adjusting rod and sleeve to move the adjusting rod and hold the adjusting rod in a selected position thereby adjust the force of the biasing means and holding the biasing means in the adjusted position.

27. The apparatus of claim 26 wherein: the means engageable with the neck section comprises a holding member slidably mounted on the member for movement along the length of the member, said holding member being non-rotatably mounted on said member.

28. The apparatus of claim 27 wherein: said holding member has a notch accommodating said neck section.

29. The apparatus of claim 27 wherein: the means for holding the biasing means in an adjusted position includes a holding arm non-rotatably mounted on the member, and means attached to the arm for moving the arm and holding the arm in a selected position, thereby adjusting the force of the biasing means and holding the biasing means in an adjusted position.

30. The apparatus of claim 22 including: projection means on each arm engageable with the member to limit downward movement of each arm.

31. The apparatus of claim 22 including: wheel means rotatably mounted on each arm.

* * * * *